(12) United States Patent
Markley

(10) Patent No.: US 6,322,469 B1
(45) Date of Patent: Nov. 27, 2001

(54) DUAL ARM CHAIN TENSIONER FOR CONTACTING MULTIPLE CHAIN STRANDS

(75) Inventor: George L. Markley, Montour Falls, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/553,828

(22) Filed: Apr. 21, 2000

(51) Int. Cl.$^7$ ........................................................ F16H 7/08
(52) U.S. Cl. ............................................. 474/111; 474/110
(58) Field of Search ..................................... 474/111, 140, 474/101, 113, 114, 115, 116, 117

(56) References Cited

U.S. PATENT DOCUMENTS

| | | | |
|---|---|---|---|
| 3,490,302 | 1/1970 | Turner et al. | 74/242.11 |
| 3,964,331 | 6/1976 | Olfield | 74/242.1 FP |
| 4,758,207 | * 7/1988 | Jepsen | 474/101 |
| 4,850,934 | * 7/1989 | Gibson, Jr. et al. | 474/111 |
| 5,055,088 | * 10/1991 | Cradduck et al. | 474/111 |
| 5,318,482 | 6/1994 | Sato et al. | 474/111 |
| 5,597,367 | 1/1997 | Trzmiel et al. | 474/110 |
| 5,797,817 | 8/1998 | Senftleben et al. | 474/110 |
| 5,967,922 | * 9/1999 | Ullein et al. | 474/111 |
| 5,989,139 | 11/1999 | Dusinberre, II et al. | 474/110 |
| 6,129,644 | * 9/2000 | Inoue | 474/110 |

FOREIGN PATENT DOCUMENTS 861741  2/1961  (GB).

* cited by examiner

Primary Examiner—Thomas R. Hannon
Assistant Examiner—Timothy McAnulty
(74) Attorney, Agent, or Firm—Sidley Austin Brown & Wood; Greg Dziegielewski

(57) ABSTRACT

A chain tensioner having a pair of tensioner arms with wear faces positioned to contact two separate strands of chain in an engine timing system. The tensioner includes an anchoring structure generally located between two sprockets interconnected by strands of power transmission chain. The anchoring structure houses a pair of parallel rods and an actuator. Tensioner arms are secured to the ends of the rods. One of the arms has a face positioned to engage an inside portion of a first strand of chain and the other arm has a face positioned to engage an outside portion of a second strand chain. The actuator pushes the arm in the inside position against the inside portion of the chain and the rods pull the arm in the outside position against the outside portion of the chain.

8 Claims, 5 Drawing Sheets

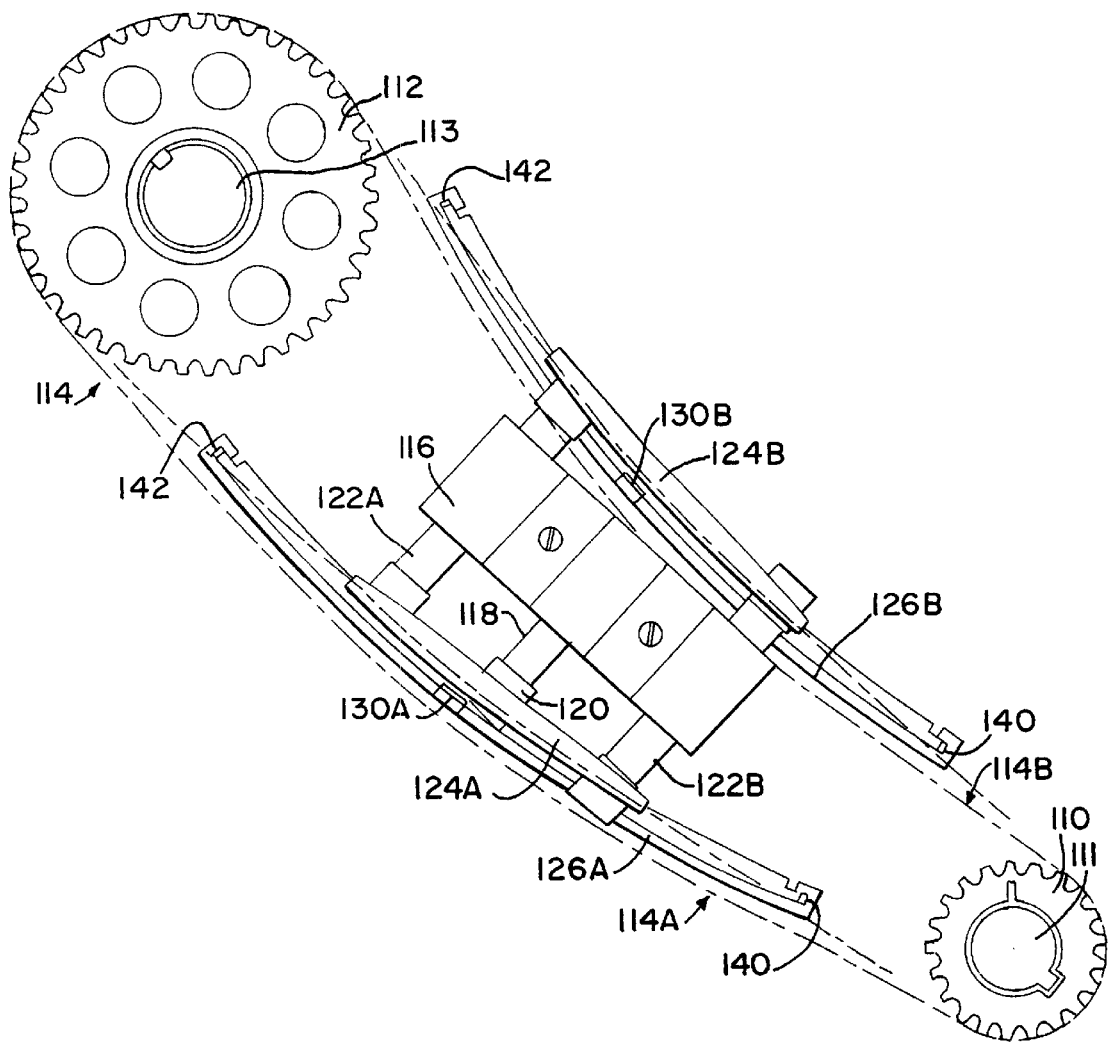
FIG.4
FIG.5
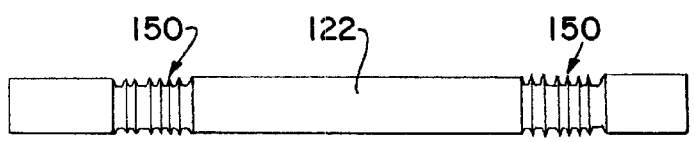

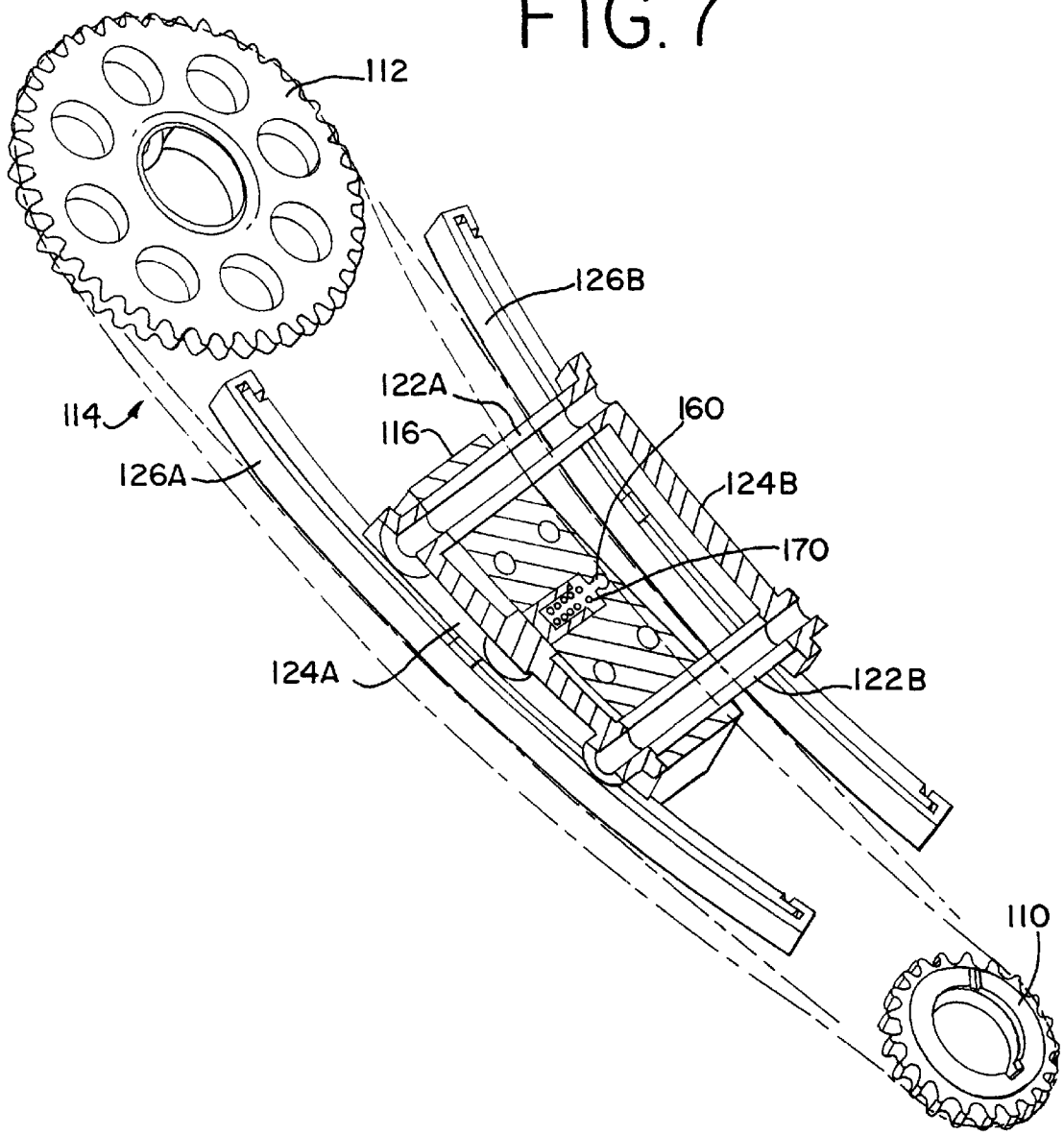

ns used with chain drives in automotive timing and power transmission applications. In particular, the present invention is related to a chain tensioner device which tensions two separate strands of chain equally.

DUAL ARM CHAIN TENSIONER FOR CONTACTING MULTIPLE CHAIN STRANDS

BACKGROUND OF THE INVENTION

The present invention relates generally to tensioners used with chain drives in automotive timing and power transmission applications. In particular, the present invention is related to a chain tensioner device which tensions two separate strands of chain equally.

Chain tensioning devices, such as hydraulic tensioners and blade-type tensioners, are used as control devices for power transmission chains as the chain travels between a plurality of sprockets. In an automotive application, the tension of the chain can vary greatly due to the wide variation in the temperature and the linear expansion among the various parts of the engine. Moreover, wear to the chain components during prolonged use can produce a decrease in the tension of the chain. As a result, it is important to impart and maintain a certain degree of tension to the chain to prevent noise, slippage, or unmeshing of the chain with the sprocket teeth. It is especially important in the case of a chain-driven camshaft in an internal combustion engine to prevent the chain from slipping because the camshaft timing can be misaligned by several degrees, possibly rendering the engine inoperative or causing damage.

Hydraulic chain tensioners typically have a plunger slidably fitted into a chamber and biased outward by a spring to provide tension to the chain. A lever arm is often used at the end of the plunger to assist in the tensioning of the chain. The hydraulic pressure from an external source, such as an oil pump or the like, flows into the chamber through passages formed in the housing. The plunger is moved outward against the arm by the combined efforts of the hydraulic pressure and the spring force.

When the plunger tends to move in a reverse direction (inward) away from the chain, typically a check valve is provided to restrict the flow of fluid from the chamber. In such a fashion, the tensioner achieves a so-called no-return function, i.e., movements of the plunger are easy in one direction (outward) but difficult in the reverse direction. An example of a check valve is shown in Dusinberre, II et al., U.S. Pat. No. 5,989,139, which is incorporated herein by reference. In addition, rack and ratchet mechanisms, which are well known in the art are employed to provide a mechanical no-return function.

One example of a chain tensioner which uses a hydraulic tensioner and a pivoted lever to tension a chain is described in Sato et al., U.S. Pat. No. 5,318,482. Sato et al. show a conventional hydraulic tensioner with a plunger pressing a pivoted lever against a chain to impart an appropriate tension to the chain. The tensioner and single arm of Sato et al. has certain limitations, however, in the amount of chain slack it can take up during the life of the chain. In addition, the single shoe arm of Sato et al. has limitations in the ability to absorb and damp cyclic vibrations in the chain during operation.

An example of a blade-type tensioner which uses a plastic shoe biased by a blade spring is described in Turner et al., U.S. Pat. No. 3,490,302. Turner et al. show a blade spring mechanically interlocked to a plastic shoe. During operation of the engine, the spring causes the shoe to gradually assume a more arcuate shape which imparts tension to an associated chain or takes up increased slack as the chain wears. Due to the nature of the shoe, however, the tensioner has a slow reaction time in response to changes in chain tension and a limited ability to respond to cyclic vibrations.

Conventional prior art tensioners which tension only one strand of chain, i.e., the length of chain between two sprockets, in an engine timing application have a common weakness. During operation of the engine, wear on the various chain parts causes the chain to lengthen. Taking up the resulting slack on one side of an engine timing system and not the other can cause the timing of the camshaft to change relative to the crankshaft.

Other prior art chain tensioners impart a load to both strands of timing chain by a pair of pistons housed in a common housing located between the chain strands. However, the two pistons in these tensioners act independently and unequally upon the tight and slack strands of chain and fail to address the change of timing which occurs when one piston travels farther and takes up more slack on one side of the timing chain during operation and wear.

To address the above problems the present invention includes a single actuator operating two coupled shoes or wear faces simultaneously. The faces bear against two separate strands of the same chain. This provides potentially double the operating take-up for a given range of tensioner operation as compared to a conventional hydraulic tensioner acting upon a single arm with a pivot. When used to tension separate strands of a single chain, vibrations which occur in one strand of chain tend to be cancelled when the energy of those vibrations are transferred to or combined with those in another strand through the multistrand tensioner. Further, when taking up chain slack in an engine timing application, the present invention helps prevent changes in the timing between the crankshaft and the camshaft during operation and as the chain wears and slackens.

SUMMARY OF THE INVENTION

The present invention provides a multistrand chain tensioner system which is designed to engage and tension two strands of chain simultaneously. The multistrand tensioner is preferably applied to a power transmission chain in an engine timing system but may be applied to a chain in any power transmission system.

The multistrand chain tensioner includes a single actuator and a pair of faces. The actuator may be a hydraulic tensioner or may be a spring based actuator, or the like. When the actuator is a hydraulic tensioner, the tensioner includes a housing with a bore. A piston or plunger is slidably disposed in the bore. The plunger is biased out from the bore by a piston spring disposed in a fluid chamber formed between the piston and housing. Pressurized fluid from an oil pump, or the like, enters the fluid chamber by way of a fluid passageway in the housing and also acts to bias the piston outwardly from the bore. The actuator may also be a simple coil or blade spring or a spring biased plunger.

A single actuator is housed within and fixed to a central anchoring or housing structure. The anchoring structure is fixed to the engine block by a plate mounting portion. A pair of parallel bars or rods pass through the central anchoring structure. The rods are free to slide through the structure. Tensioner arms are fastened securely to the end faces at the ends of the rods such that relative movement between the rods and the arms is prevented. A shoe or tensioner wear face is fixed to each arm by way of retention tabs, dovetail fittings or any suitable method. The faces are adapted to each contact a separate strand of the same chain.

The housing or anchoring structure is preferably located between strands of the chain and generally between the two sprockets about which the chain is wrapped. In operation, the actuator, which is located in the anchoring structure, produces an outward force upon one of the arms. The arm acted upon by the actuator is positioned inside the chain loop. Thus, the actuator forces the inside arm and inside face against an inside portion of a first strand of chain. The rods attached to the inside arm on one end are attached to an outside arm at an end opposite the inside arm. The rods act to pull the outside arm against an outside portion of a second strand of the chain.

For a further understanding of the present invention and the objects thereof, attention is directed to the drawing and the following brief description thereof, to the detailed description of the preferred embodiment of the invention and to the appended claims.

BRIEF DESCRIPTION OF THE DRAWINGS

FIG. 4 is a front view of the tensioner of FIG. 3 depicting the tensioner of the present invention in an extended position as encountered with a worn chain.

FIG. 5 is a side view of a rod with ratchet teeth formed thereon.

FIG. 7 is a cross-sectional perspective view of the tensioner of FIG. 3.

DETAILED DESCRIPTION OF THE PREFERRED EMBODIMENTS

Figure 1:
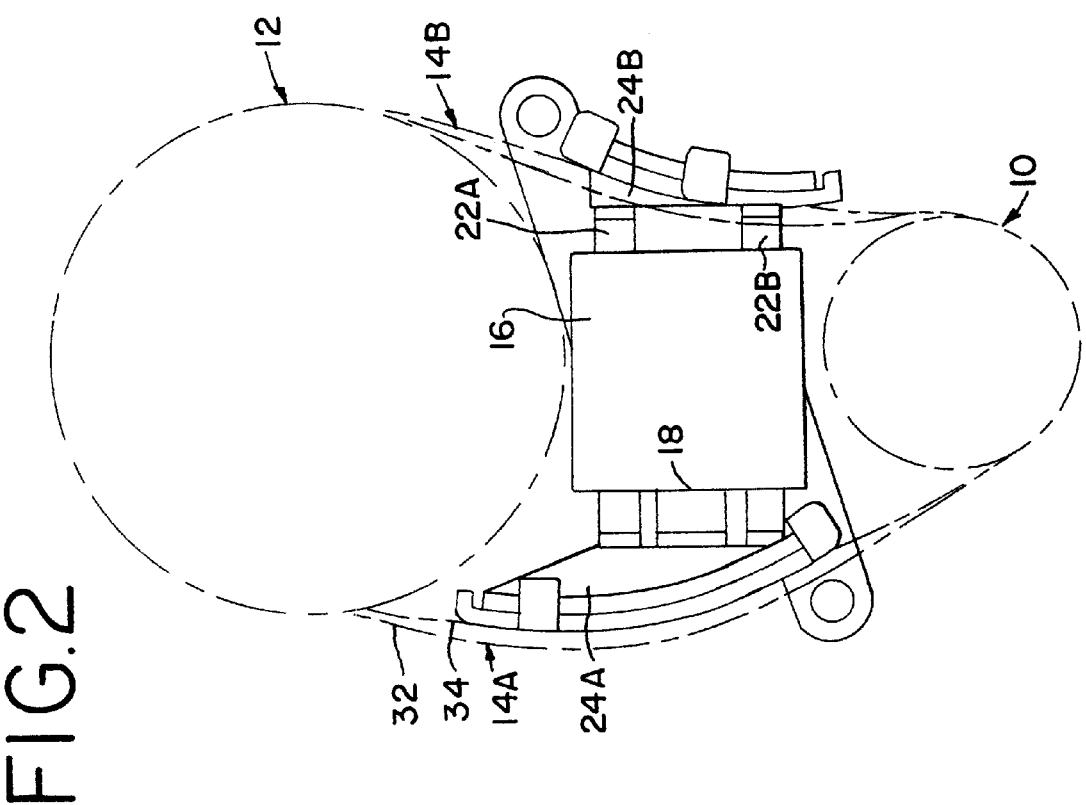
FIG. 1 is a front view of a first embodiment of the present invention.
Figure 2:
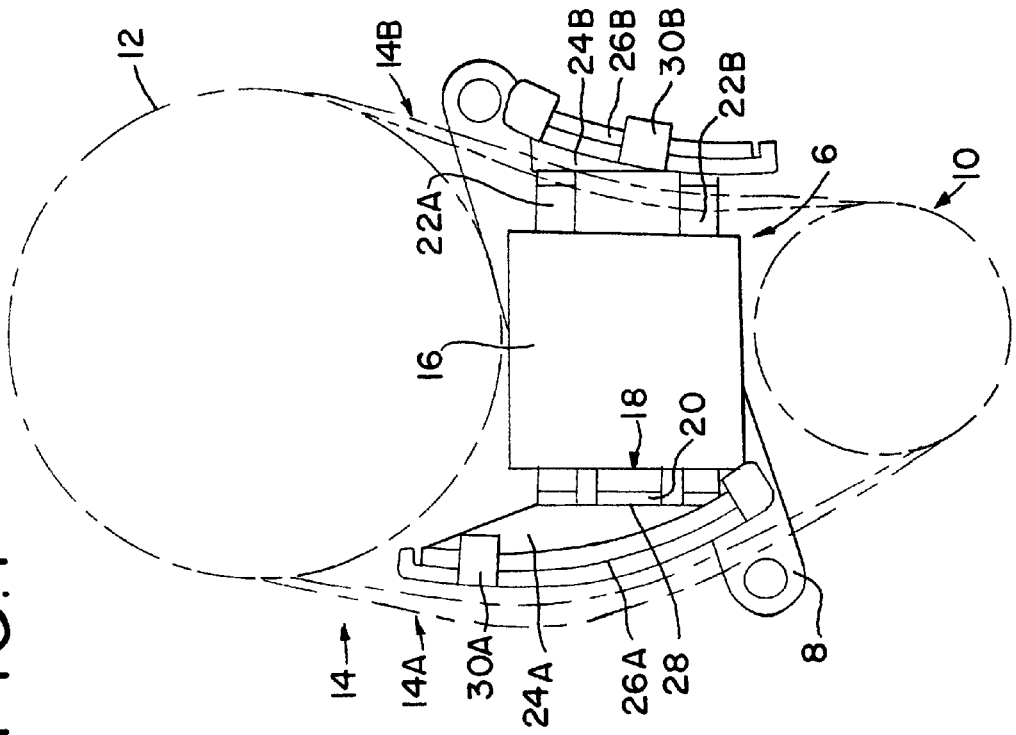
FIG. 2 is a front view of the tensioner of FIG. 1 depicting the tensioner of the present invention in an extended position as encountered with a worn chain.

Turning now to the drawings, FIGS. 1 and 2 illustrate a first preferred embodiment of the multistrand chain tensioner 6 of the present invention. FIG. 1 illustrates the position of the tensioner and chain in an engine timing system with a relatively new or unworn chain and a retracted tensioner. The figure shows a system depicting generally a pair of sprockets, including a crankshaft sprocket 10 (driving) and a camshaft sprocket 12 (driven). A power transmission chain 14 is wrapped around the sprockets and transfers power from the driving sprocket 10 to the driven sprocket 12. If the system rotates in a clockwise direction a strand of chain 14A, located on the left side of the figure, will have relatively less tension relative to the strand of chain 14B located on the right side of the figure. A strand is the portion of chain that travels between the two sprockets at any given instance during operation.

The anchoring structure 16 is positioned between the two strands 14A, 14B of chain 14 to be tensioned. The anchoring structure is mounted to an engine block (not shown) by a mounting plate portion 8. A single actuator 18 is located in or on the anchoring structure 16. The actuator 18 may be a single conventional hydraulic tensioner or spring biased tensioner, or the like, insofar as it possesses the range and force properties sufficient to produce the desired motion in the actuator to provide appropriate tensioning force. The actuator 18 has a protruding plunger 20 or protruding element which projects outwardly from the anchoring structure 16.

The anchoring structure 16 also contains a pair of bores containing a pair of substantially parallel rods 22A, 22B or bars which travel through and have first and second ends which project out from the sides of the anchoring structure. The bores and rods are substantially parallel with respect to the motion produced by the actuator plunger 20. The rods 22A, 22B are free to slide in the bores. A pair of arms 24A, 24B are secured to the ends or end faces of the rods 22A, 22B. A first end of rod 22A is connected to the upper portion of arm 24A and the second end of rod 22A, located opposite the first end, is connected to the upper portion of arm 24B. Similarly, a first end of rod 22B is connected to the lower portion of arm 24A and the second end of rod 22B, located opposite the first end, is connected to the lower portion of arm 24B. Thus, the arms 24A, 24B are rigidly coupled together by connections at both ends of rods 22A, 22B. It should be understood that the two rods could be replaced with a single rod or a solid structure that supports the length of the arm. In such an instance, the location of the actuator may be relocated to a position which would not interfere with the operation of the arm or solid structure, for example, outside of the anchoring structure.

The first arm 24A, located on the inside of the chain has a wear face 26A or shoe fastened thereto. In the present example, the face 26A is held fastened to the arm 24A by way of retention tab 30. The inside face is held by the arm 24A adjacent an inside portion of chain strand 14A. The first arm 24A has a back surface 28 in contact with the actuator 18. The actuator 18 is positioned to produce a force against the back surface 28 of the inside arm 24A, whereby the inside arm is forced against the inside portion of the chain strand 14A.

The second arm 24B, or outside arm is located outside the chain strand 14B and is fastened to the ends of the rods 22A, 22B opposite the inside or first arm 24A and face 26A by retention tab 30B. An outside face 26B is secured to the second arm 24B such that it may be brought to bear upon an outside portion of the chain strand 14B when the rods 22A, 22B pull the second arm 24B in toward the anchoring structure 16. The rods 22A, 22B rigidly couple the action of the two arms and faces. Thus, when the actuator 18 pushes the first arm 24A away from the anchoring structure 16 the second arm 24B is pulled inwardly. As a result of the coupling of the two arms by the rods, there is no relative motion between the two rods and faces, i.e., they share the same amount of movement. Accordingly, the tensioner imparts the same amount of travel distance to the two tensioned chain strands and avoids changing the timing of the system. The object is not to impart the same amount of tension to both chain strands but to tension the chain as a whole in such a way as to avoid timing changes.

FIG. 2 shows the multistrand tensioner 6 of FIG. 1 in an engine timing system with a relatively worn chain. The path of the worn chain 32 is depicted alongside the path of an unworn chain 34. Wear causes a lengthening of the chain. The actuator 18 is therefore extended farther outwardly from the anchoring structure 16 and the rods 22A, 22B have forced both arms 24A, 24B in a generally left direction the same travel distance. This causes the same movement of the chain in both the "loose" strand 14A and the "tight" strand 14B. Because tension is being taken up in both chain strands, and thus, both sides of the timing system, the relative timing between the crank sprocket and the cam sprocket is less affected than by the prior art tensioner which only tensions one chain strand, or both tight and slack chain strands separately. Alternatively, one of the arms could be permitted to move freely more relative to the rods in order to apply different tensioning forces to the two arms.

Figure 3:
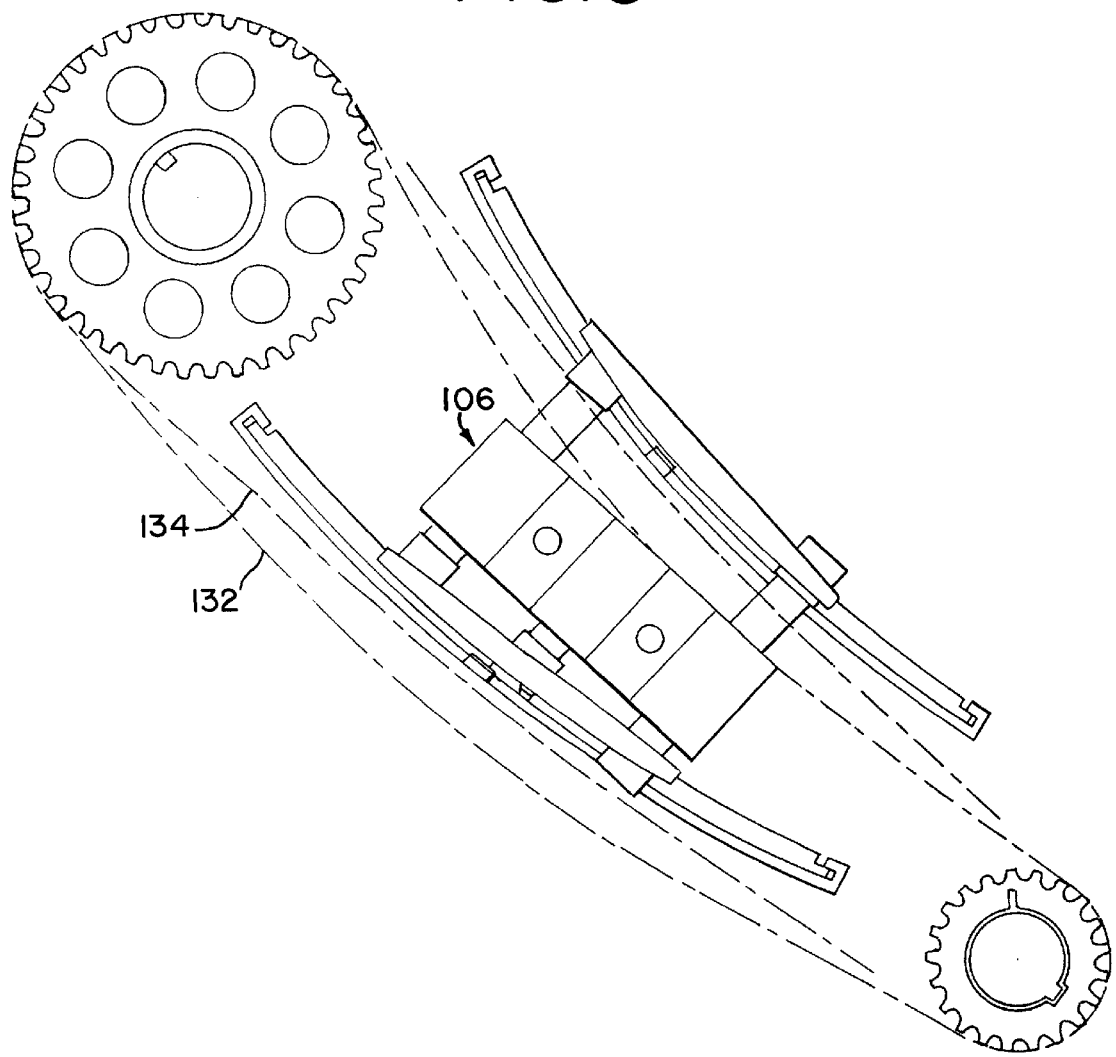
FIG. 3 is a front view of a second embodiment of the present invention.

FIGS. 3 and 4 show an embodiment of the present invention having relatively long tensioner arms and shoes that extend along a substantial portion of each strand. FIG. 3 shows the multistrand chain tensioner 106 in a retracted condition and applied to an engine timing system with "new" 134 and "worn" 132 chain paths depicted. FIG. 4 shows the tensioner of the present invention in an extended position as when the chain is in a worn condition. Similar to the tensioner shown in FIGS. 1 and 2, a chain 114 is wrapped around a crank sprocket 110 mounted on a crankshaft 111 and a cam sprocket 112 mounted on a camshaft 113. Thus, the chain 114 transfers power from the crankshaft 111 to the camshaft 113. An anchoring structure 116 is located between two strands of the chain 114. An actuator 118, such as a hydraulic tensioner is located in the anchoring structure 116. A plunger 120 extends outwardly from the anchoring structure 116.

The anchoring structure 116 contains a pair of bores containing a pair of substantially parallel rods 122A, 122B or bars. The bores and rods are substantially parallel with respect to the motion produced by the actuator plunger 120 and are free to slide in the bores. A pair of arms 124A, 124B are secured to the ends of the rods 122A, 122B. A first arm 124A, located on the inside of the chain 114 has a wear face 126A or shoe fastened thereto. The inside face 126A is held by the arm 124A adjacent an inside portion of chain strand 114A. The first arm 124A is secured to the actuator 118. When the actuator 118 produces a force against the inside arm 124A the inside face 126A is forced against an inside portion of the adjacent chain strand 114A.

A second arm 124B, or outside arm is located outside the chain loop 114B and is fastened to the ends of the rods 122A, 122B opposite the inside or first arm 124A and face 126A. A second face 126B is secured to the second arm 124B such that it may be brought to bear upon an outside portion of the chain strand 114B when the rods 122A, 122B pull the second arm 124B in toward the anchoring structure 116. Each face in this illustration is held to a respective arm by retention tabs 130A, 130B and end pockets 140, 142 located on opposite ends of faces 126A, 126B. The rods couple the action of the two arms and faces. Thus, when the actuator pushes the first arm 124A away from the anchoring structure the second arm 124B is pulled inwardly.

The force required to properly tension the two chain strands is likely to be different. Typically, one strand will be tighter, or in greater tension, than the other strand. In a rigid assembly, the two arms will move the same distance to apply tensioning force. Accordingly, the ends of the rods along one strand may include some resiliency or play to permit greater movement of the tensioner arm on that side. In this manner, the two chain sides will be provided with different amounts of tensioning force.

Vibrations in the chain are effectively dampened by the multistrand tensioner of the present invention by combining the cyclic energy between chain strands. Because the two tensioner arms are coupled by the rods, the forces created by vibrations in one chain strand are transmitted to or combined with those originating in the other chain strand. It is believed that the combination and resultant cancellation of some forces by engaging two chain strands with one multistrand tensioner will result in less overall vibration in the power transmission system.

A beneficial effect of the chain motion on the tensioner may be produced when drag of the chain across the tensioner shoes imparts a slight rotational binding torque to the tensioner arms and rods. This would produce a ratchet effect. In other words, if the chain is moving in a clockwise direction, an upward force is imparted to the arm and rod ends on the left or inside portion of the tensioner and a downward force is imparted to the arm and rod ends to the right or outside portion of the tensioner. When chain tension is relatively high, the torque effect on the tensioner would be correspondingly high. The effect of the torque would be a binding effect of the rods in the bores resulting in the rods resisting sliding in the bores. This would accomplish a no-return function commonly engineered into hydraulic tensioners with rack and ratchet devices.

An alternate embodiment of the present invention would include providing the rods 122 with teeth in a ratchet arrangement 150 as shown in FIG. 5 (exaggerated). The bores of the anchoring structure may be provided with a corresponding engaging portion to create a true no-return ratchet function. In this embodiment, the rods would be free to slide in the bores to react to fluctuating chain tension. However, when chain tension becomes high the torque applied to the tensioner will cause the ratchet portions of the rods to engage and the tensioner will "lock" into place creating the no-return condition and enhanced control of the chain.

Figure 6:
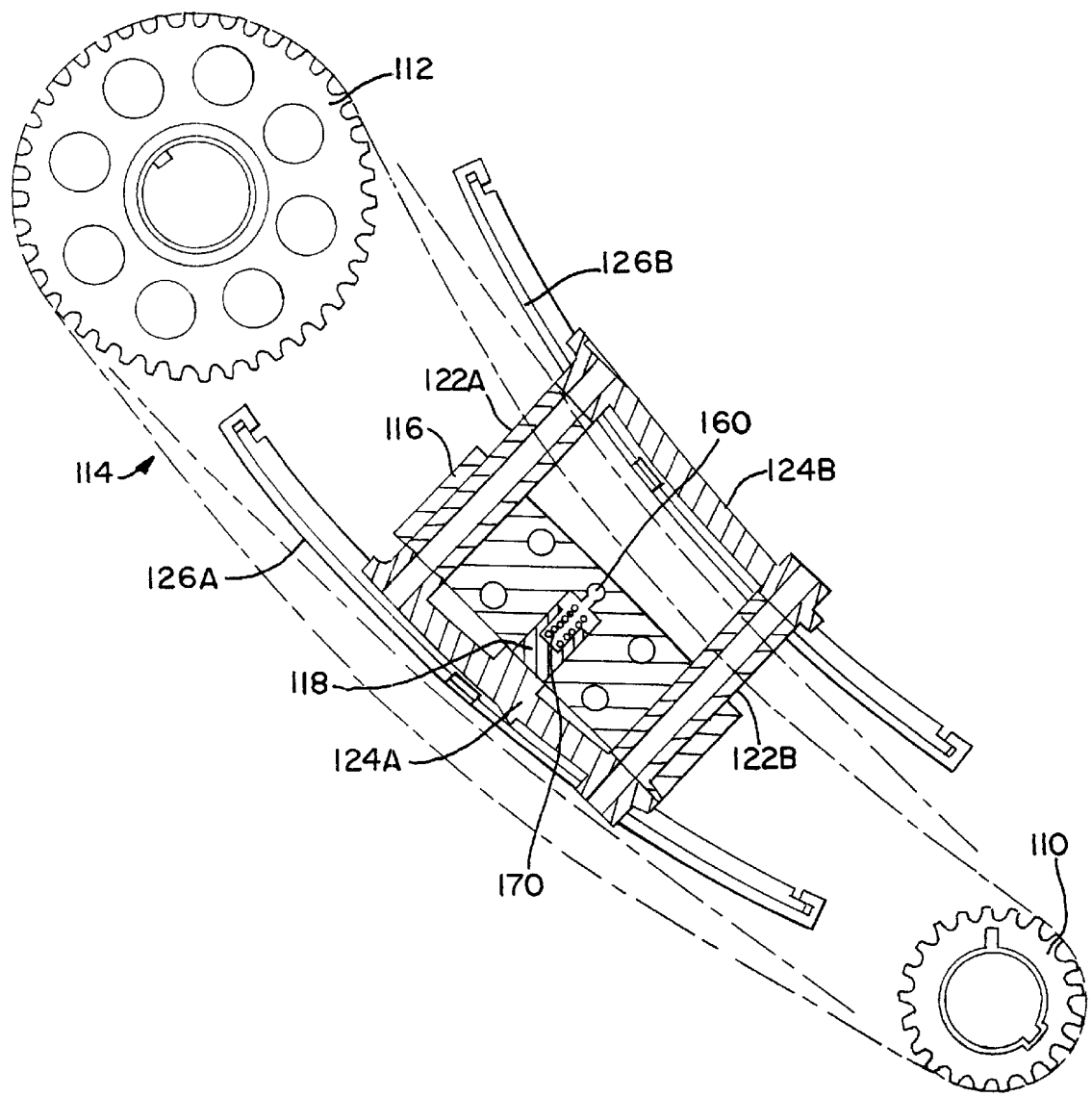
FIG. 6 is a cross-sectional view of the tensioner of FIG. 3.

FIGS. 6 and 7 illustrate in cross section the multistrand tensioner of FIG. 3. A power transmission chain 114 is wrapped around a crank sprocket 110 and a cam sprocket 112. The anchoring structure 116 is analogous to a conventional hydraulic tensioner housing, in that the anchoring structure is fixed to a mounting surface, typically to the engine block. Also, the anchoring structure provides for the housing of a piston, actuator 118 or the like, which is biased in an outward direction from the structure 116 by a spring 170. In addition, the structure 116, if housing a hydraulically actuated plunger or piston, may provide a fluid conduit 160 from a supply of high pressure fluid (not shown) to act on the piston 118 in addition to the spring 170.

The anchoring structure 116 includes a pair of parallel rods 122A, 122B in an upper and lower portion of the structure, respectively. The rods 122A, 122B are disposed in a pair of bores formed through the structure 116 which are parallel to the stroke of the piston 118 and which allow the rods to slide freely in the bores. Arms 124A, 124B are attached to opposite ends of rods 122A, 122B and carry the tensioner shoes for contacting the chain 114.

In operation, high pressure fluid enters a hollow bore in the structure 116 through conduit 160. The fluid imparts an outward force to the actuator 118 which is slidably received in the bore in addition to the force provided by the spring 170. The actuator is positioned to act directly on arm 124A. As a result of the outward motion of the actuator, the arm 124A moves outwardly relative to the structure 116 and causes shoe 126A to contact and impart tension to the adjacent strand of chain 114 (shown on the lower left side of the figure). In this case, the shoe 126A contacts an inside portion of the chain strand.

The left ends of the rods 122A, 122B are attached to the arm 124A. When the arm 124A moves away from the structure 116 the rods 122A, 122B are pulled in the direction of the actuator 118 and arm 124A. The arm 124B is attached to the ends of the rods 122A, 122B opposite the arm 124A. When the arm 124A is pushed away from the structure 116 by motion of the actuator 118, the attached rods 122A, 122B pull the arm 124B and attached shoe 126B into contact with and impart tension to the strand of chain 114 adjacent the shoe 126B (shown on the upper right side of the figure). The shoe 126B contacts an outside portion of the chain strand. When fluid pressure falls and/or the chain tension increases the shoes, arms and rods as a unit, and the actuator move in the reverse direction. The present invention also contemplates use of a check valve between the source of pressurized fluid and an hydraulic actuator or plunger. The check valve acts to prevent the actuator from moving in a reverse or inward direction by blocking the flow of fluid from out of a fluid chamber formed in the housing of the actuator. In such a case, the dual arms of the chain tensioner of the present invention resist moving in response to times when the force of the chain tension is greater than the force of the tensioner spring and fluid pressure.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A dual arm chain tensioner for simultaneously tensioning both strands of a chain travelling around a pair of sprockets in a power transmission system comprising:

an anchoring structure, said anchoring structure having at least one bore formed therein;

an actuator located on said anchoring structure, said actuator being biased by a spring in an outward direction from said anchoring structure toward one of said chain strands and transverse to the direction of travel of said chain strand;

a rod slidably positioned in said bore, said rod sliding in an axial direction substantially parallel to said outward direction of said actuator, said rod having a first end located on one side of said anchoring structure near a first of said pair of chain strands and having a second end opposite said first end near a second of said pair of chain strands;

a first tensioner arm secured to said first end of said rod;

a first face attached to said first arm, said first face positioned to contact an inside portion of a said first chain strand;

a second tensioner arm secured to said second end of said rod;

a second face attached to said second arm, said second face positioned to contact an outside portion of said second chain strand;

said actuator acting upon one of said first and second arms to cause said first face to impart tension to said first strand of said chain and said second face to impart tension to said second strand of said chain.

2. The dual arm chain tensioner of claim 1 wherein said anchoring structure has a pair of bores; and a pair of rods slidably positioned in said pair of bores, said pair of rods sliding in an axial direction substantially parallel to said outward direction of said actuator, said pair of rods having first ends located on one side of said anchoring structure near said first of said pair of chain strands and having second ends opposite said first ends near a second of said pair of chain strands;

said first tensioner arm being secured to said first ends of said rods;

said second tensioner arm being secured to said second ends of said rods.

3. The dual arm chain tensioner of claim 2 wherein said pair of rods move perpendicular to said direction of travel of said chain strands.

4. The dual arm chain tensioner of claim 2 wherein said first tensioner arm is generally parallel to said second tensioner arm.

5. The dual arm chain tensioner of claim 2 wherein said pair of rods are perpendicular to said first and second tensioner arms.

6. The dual arm chain tensioner of claim 2 wherein said pair of rods have a series of circumferential grooves formed thereon for ratcheting against said anchoring structure.

7. The dual arm chain tensioner of claim 2 wherein one of said first and second ends of said pair of rods has resilient connections thereon for connecting to a respective one of said first and second tensioner arms, said resilient connection providing relative movement between said one of said first and seconds ends of said pair of rods and said one of said first and second tensioner arms connected thereby.

8. The dual arm chain tensioner of claim 2 wherein said anchoring structure has a third bore formed therein for housing said actuator, said actuator including a plunger being slidably disposed in said third bore and biased in an outward direction from said anchoring structure by said spring and by fluid pressure from a source of pressurized fluid.

* * * * *